(12) United States Patent
Brand

(10) Patent No.: US 6,466,407 B1
(45) Date of Patent: Oct. 15, 2002

(54) METHOD AND APPARATUS FOR APPLYING AN INFORMATION PATTERN TO A DISC HEAD SLIDER

(75) Inventor: John L. Brand, Burnsville, MN (US)

(73) Assignee: Seagate Technology, LLC., Scotts Valley, CA (US)

( * ) Notice: Subject to any disclaimer, the term of this patent is extended or adjusted under 35 U.S.C. 154(b) by 0 days.

(21) Appl. No.: 08/711,499

(22) Filed: Sep. 10, 1996

Related U.S. Application Data

(60) Provisional application No. 60/023,536, filed on Aug. 7, 1996.

(51) Int. Cl.[7] .............................................. G11B 17/32
(52) U.S. Cl. ..................................... 360/235.1; 360/237
(58) Field of Search ................................. 360/103–104

(56) References Cited

U.S. PATENT DOCUMENTS

| | | | |
|---|---|---|---|
| 4,910,621 A | | 3/1990 | Matsuda et al. ............. 360/104 |
| 5,142,383 A | * | 8/1992 | Mallik ............................ 359/2 |
| 5,220,471 A | | 6/1993 | Matsuzaki ................... 360/103 |
| 5,237,476 A | | 8/1993 | Bischoff et al. ............. 360/126 |
| 5,256,850 A | | 10/1993 | Maegawa et al. ...... 219/121.69 |
| 5,303,105 A | | 4/1994 | Jorgenson .................... 360/106 |
| 5,442,850 A | | 8/1995 | Kerth ............................ 29/603 |
| 5,625,384 A | * | 4/1997 | Numata et al. ................ 347/23 |
| 5,821,746 A | * | 10/1998 | Shelor ......................... 324/210 |

FOREIGN PATENT DOCUMENTS

| | | | | |
|---|---|---|---|---|
| JP | 0069623 | * | 6/1978 | ................. 360/103 |

OTHER PUBLICATIONS

IBM Technical Disclosure Bulletin (vol. 22, No. 1, Jun. 1979, p. 331), 6/79.*
IBM Technical Disclosure Bulletin (vol. 25, No. 7A, p. 3266), 12/82.*
Photograph of TDK AAB Slider from Pike Disc Drive (2 pages).
Photograph TDK TPC ABS from Quantum Fireball 2 Drive.

* cited by examiner

*Primary Examiner*—Allen T. Cao
(74) *Attorney, Agent, or Firm*—Westman, Champlin & Kelly

(57) ABSTRACT

A method of applying a serial number or other information to disc head slider substrate according to the present invention includes applying a metal film to a surface on the slider substrate and laser scribing the serial number or other information into the metal film.

10 Claims, 3 Drawing Sheets

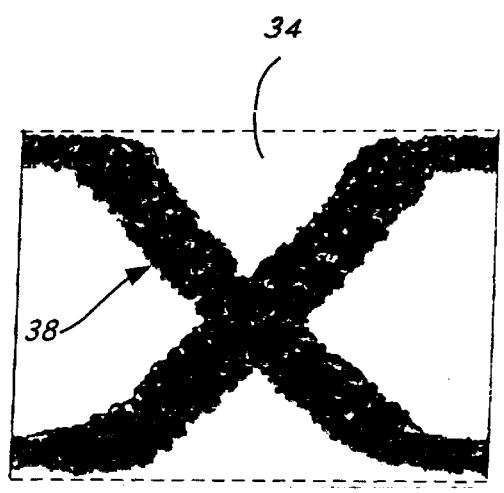
FIG. 5
(PRIOR ART)
FIG. 4

METHOD AND APPARATUS FOR APPLYING AN INFORMATION PATTERN TO A DISC HEAD SLIDER

CROSS REFERENCE TO A RELATED APPLICATION

This application claims priority from U.S. Provisional Application Serial No. 60/023,536, filed Aug. 7, 1996 and entitled "LASER SCRIBING THROUGH A METAL FILM FOR REDUCED CONTAMINATION AND ENHANCED CONTRAST".

BACKGROUND OF THE INVENTION

The present invention relates to disc drive data storage systems and, more particularly, to a method of applying a serial number or other information pattern to a surface of a disc head slider.

Disc drives of the "Winchester type" are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). The HGAs carry transducers which write information to and read information from the disc surface. An actuator mechanism moves the HGAs from track to track across the surface of the discs under control of electronic circuitry. The actuator mechanism includes a track accessing arm and a load beam for each HGA. The load beam provides a preload force which presses the HGA toward the disc surface.

The HGA includes a hydrodynamic (e.g. air) bearing slider and a gimbal. The gimbal is positioned between the slider and the load beam to provide a resilient connection that allows the slider to pitch and roll while following the topography of the disc. The slider includes a slider body having a leading edge, a trailing edge and an air bearing surface which faces the disc surface. As the disc rotates, the disc drags air under the slider along the air bearing surface, which creates a hydrodynamic lifting force that causes the slider to lift and fly above the disc surface. The transducer is typically mounted at or near the trailing edge of the slider.

Air bearing disc head sliders are formed from a substrate known as a wafer. A matrix of transducers is applied to a top surface of the wafer and then the wafer is sliced into a plurality of bars. Each bar includes a plurality of individual slider bodies, with each body having a corresponding transducer. Each bar is then diced into individual slider bodies.

It is often desired to apply a serial number or some other useful information to each slider body. Serial numbers have been applied to the leading edges of slider bodies by a laser scribing process. During the laser scribing process, a beam of laser light is directed toward the slider substrate material. The beam removes material in a pattern corresponding to the serial number. A disadvantage of the laser scribing process is that the removed material often redeposits on the slider substrate, which creates contamination. Furthermore, the legibility of the applied serial number is occasionally questionable.

SUMMARY OF THE INVENTION

The method of applying an information pattern to a disc head slider according to the present invention includes applying a metal film to a surface on the slider substrate and then laser scribing the information pattern into the metal film.

In one embodiment, the information pattern includes a serial number for the particular slider body to which the serial number is applied. The step of laser scribing preferably ablates material to a depth which is equal to the thickness of the metal film, with little or no substrate material being removed. In another embodiment, the step of laser scribing ablates material to a depth which is less than the thickness of the metal film. In yet another embodiment, material is removed to a depth which is greater than the thickness of the metal film such that the serial number is scribed through the metal film and into the surface of the slider substrate. The metal film may then be removed, leaving the serial number in the exposed substrate surface.

The metal film can be applied by sputtering, plating, chemical vapor deposition or other means for applying a thin metal film. The thickness of the metal can be monolayers to several microns. The steps of applying the metal film and the step of laser scribing can be performed at a wafer level, a bar level, or a slider level. In a preferred embodiment, the metal film and identification pattern are applied to a leading edge of each slider body, at the wafer level.

BRIEF DESCRIPTION OF THE DRAWINGS

FIG. 4 is a greatly magnified illustration of a letter which was laser scribed on a metal film according to the present invention.

FIG. 5 is a greatly magnified illustration of a letter laser scribed on an uncoated slider substrate according to the prior art.

DETAILED DESCRIPTION OF THE PREFERRED EMBODIMENTS

Figure 1:
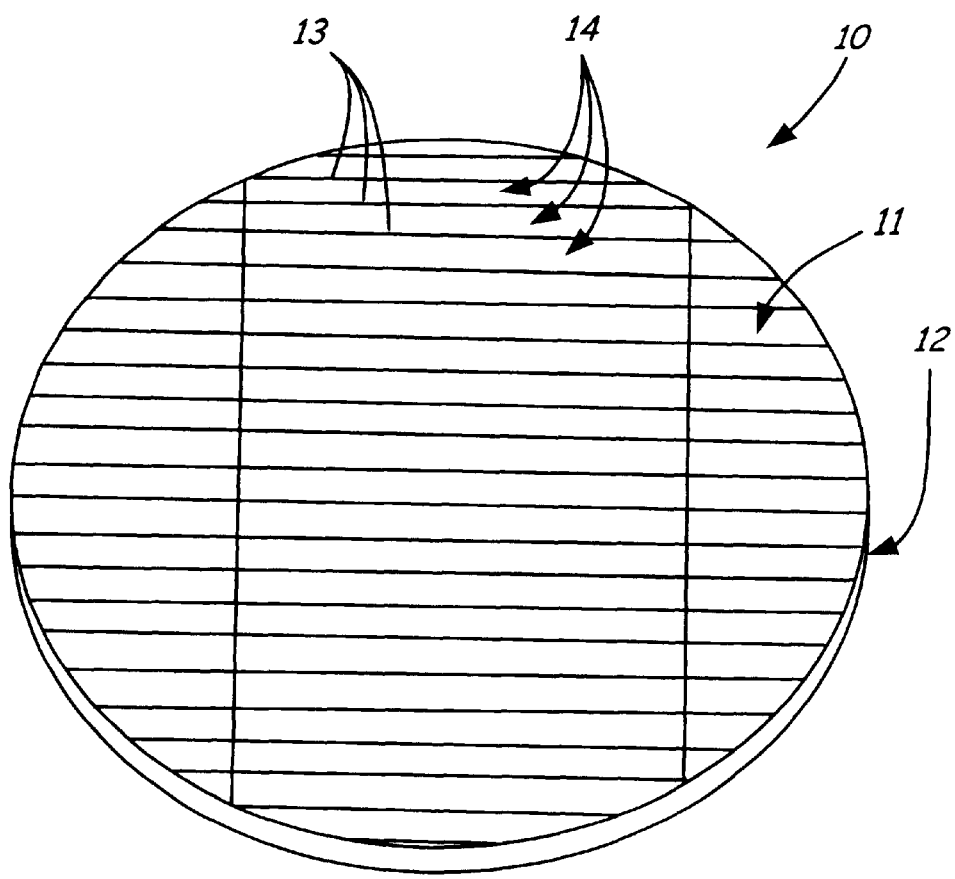
FIG. 1 is a perspective view of a wafer of slider substrate material from which a slider according the present invention is fabricated.
Figure 2:
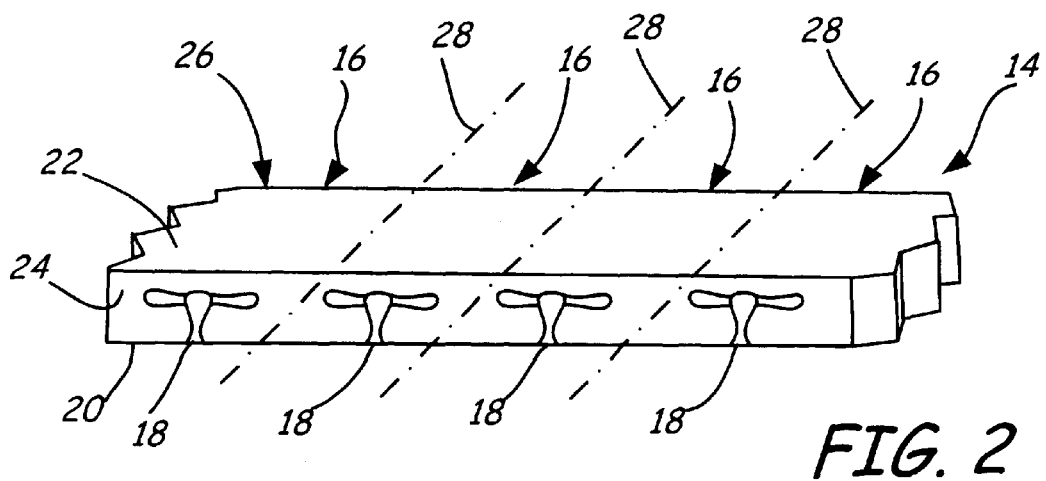
FIG. 2 is a fragmentary perspective view of a bar of slider bodies sliced from the wafer shown in FIG. 1.

Hydrodynamic bearing disc head sliders are formed from a substrate known as a wafer. FIG. 1 is a perspective view of typical wafer 10. Wafer 10 can include aluminum oxide titanium carbide, aluminum silicon magnesium or silicon, for example. Wafer 10 has a top surface 11 and a bottom surface 12. In a typical fabrication process, a matrix of transducers (not shown) is applied to top surface 11. Wafer 10 is then sliced along rows 13 into a plurality of bars 14. Each bar 14 includes a plurality of individual slider bodies, with each body having a corresponding transducer. FIG. 2 is fragmentary, perspective view of a bar of slider bodies sliced from wafer 10. Each bar 14 includes a plurality of individual slider bodies 16, with each slider body having a corresponding transducer 18. The sliced surfaces become bearing surface 20 and back surface 22. The top surface 11 of wafer 10 becomes trailing surface 24 and the bottom surface 12 of wafer 10 becomes leading surface 26.

Once wafer 10 has been sliced into individual bars 14, air bearing features are formed into the bearing surface 20 of each slider body 16. Once the air bearing features have been formed, each bar 14 is diced along a plurality of dice lanes 28 into the plurality individual slider bodies 16.

In order to identify each slider body 16, a serial number is formed on the leading surface 26 of each slider body 16. The serial number can be applied at the wafer level shown in FIG. 1, the bar level shown in FIG. 2 or the slider level. In a preferred embodiment, the serial number for each slider body is applied at the wafer level by laser scribing the serial number to the bottom surface 12 of wafer 10 at an appropriate location. However, for simplicity, the process of applying the serial number to the slider substrate material will be discussed with reference to an individual slider body.

Figure 3A:
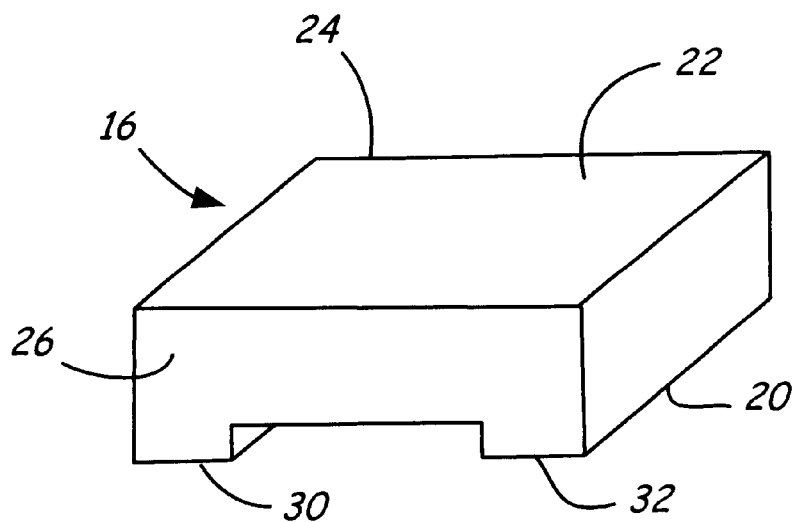
FIGS. 3a–3c are end views of a slider body during a slider fabrication process according to the present invention.
Figure 3B:
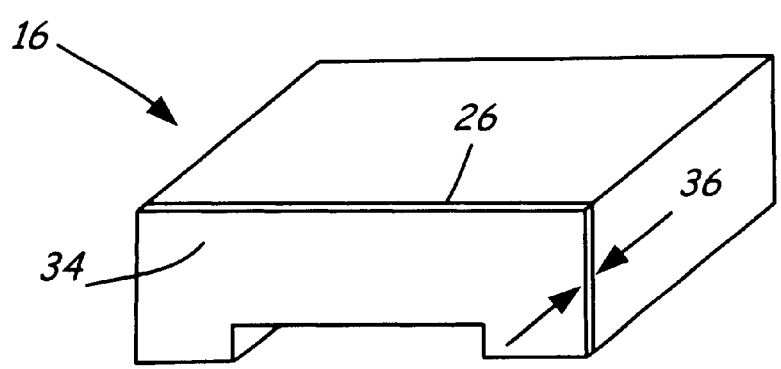
Figure 3C:
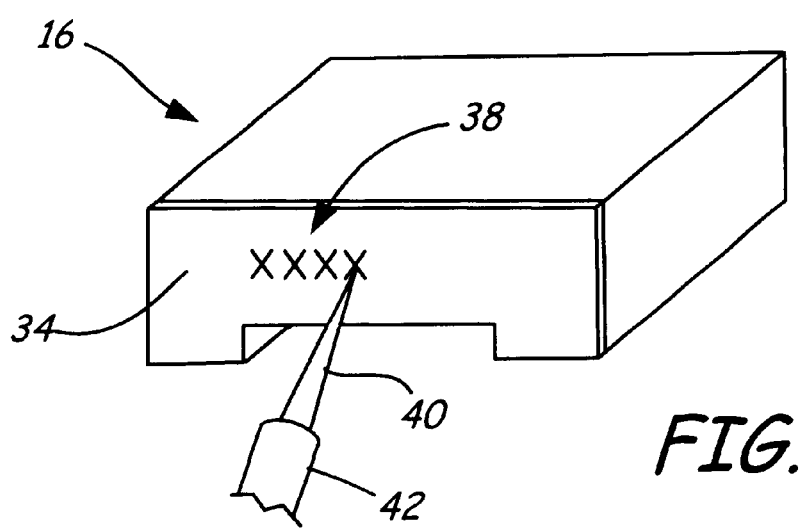

FIGS. 3a–3c are perspective views illustrating an individual slider body during various steps of the fabrication process of the present invention. FIG. 3a illustrates slider body 16 after dicing. Slider body 16 includes air bearing surface 20, back surface 22, trailing surface 24 and leading surface 26. The air bearing features have been formed in air bearing surface 20 and include raised side rails 30 and 32.

In FIG. 3b, a thin, metal film 34 is applied to leading surface 26. Metal film 34 can be applied by sputtering, plating, chemical vapor deposition or other means for applying a thin metal coating. Metal film 34 has a thickness 36 which can range from a monolayer to several microns, such as 5.0 microns. In a preferred embodiment, thickness 36 is 100–1000 angstroms. Metal film 34 can be applied to the entire leading surface 26 or only a portion of leading surface 26. Metal film 34 preferably has good adhesion properties. Suitable materials for metal film 34 include chrome, tantalum, and molybdenum, for example. However, any suitable metal material can be used for metal film 34.

In FIG. 3c, a serial number 38 is formed in metal film 34 by laser "scribing" or laser "etching". A beam of laser light 40 is directed from light source 42 toward metal film 34. The beam of laser light 40 applies radiation to metal film 34 in the form of a high peak, short duration photon energy pulse which is raster scanned over metal film 34 in a pattern 38 corresponding to the desired serial number or other useful information. The radiation ablates the metal film material within pattern 38.

In a preferred embodiment, the laser spot energy density and the pulse duration are adjusted such that the metal film material is completely removed within pattern 38 without removing any underlying slider substrate material. Laser scribing can be preformed by using a pulsed YAG laser, such as a 532 nm double YAG laser or a UV laser. $CO_2$ lasers and excimer lasers are other examples of lasers that can be used. Also, a continuous wave laser beam can be used instead of a pulsed beam. These lasers have different wavelength energies and different beam characteristics which may be advantageous in specific applications and on specific materials.

Laser scribing the serial number into metal film 34, as opposed to directly into the slider substrate material, results in greater contrast in the scribed pattern, which makes the serial number more legible. Also, metal film 34 can be formed very thin, which results in less material being redeposited on the slider substrate and thus less contamination. The decrease in redeposited material also results in less material accumulation at the edge of pattern 38. This further increases legibility.

In another embodiment, the laser spot energy density and the pulse duration are adjusted such that material is removed to a depth which is less than the thickness of metal film 34. In yet another embodiment, material is removed to a depth which is greater than the depth of metal film 34. In this embodiment, a portion of the slider substrate material which underlies metal film 34 is also removed. The desired pattern is formed through metal film 34 and into the slider substrate material. Metal film 34 can then be stripped from the slider substrate, leaving the desired pattern in the slider substrate. Alternatively, metal film 34 can be left on the slider substrate.

FIG. 4 is a greatly magnified illustration of a letter X laser scribed within metal film 34, as described with reference to FIG. 3c. The letter X is clearly legible on metal film 34.

FIG. 5 is a greatly magnified illustration of a letter X laser scribed within an uncoated slider substrate according to the prior art. The letter X is much less legible than in FIG. 4. In addition, with an uncoated slider, the laser scribing often creates contamination through substrate redeposition.

Although the present invention has been described with reference to preferred embodiments, workers skilled in the art will recognize that changes may be made in form and detail without departing from the spirit and scope of the invention. For example, the position of the serial number is not limited to the leading surface of the slider substrate. The serial number can be applied to any surface on the slider substrate in accordance with the present invention. Also, other useful information can be laser scribed into the slider substrate, such as a date of manufacture or a company logo.

What is claimed is:

1. A disc head slider for use in a disc drive data storage system, comprising:
   a slider body comprising a slider substrate material having a surface;
   a transducer supported by the slider body;
   a metal film applied to the surface; and
   an information pattern recessed within the metal film and graphically representing a serial number for the disc head slider.

2. The disc head slider of claim 1 wherein:
   the slider body further comprises a leading surface, a trailing surface and a bearing surface; and
   the metal film is applied to the leading surface.

3. The disc head slider of claim 1 wherein the information pattern includes a laser scribed pattern within the metal film.

4. The disc head slider of claim 1 wherein the metal film is formed of a material selected from the group consisting of chrome, tantalum and molybdenum.

5. The disc head slider of claim 1 wherein the metal film has a thickness of one monolayer to five microns.

6. The disc head slider of claim 5 wherein the thickness is one hundred to one thousand angstroms.

7. The disc head slider of claim 1 wherein the metal film has a thickness and the information pattern is recessed into the metal film by a depth that is at least as great as the thickness such that the slider substrate is exposed through the metal film, within the information pattern.

8. The disc head slider of claim 1 wherein the metal film has a thickness and the information pattern is recessed into the metal film by a depth that is less than the thickness.

9. A disc head slider for use in a disc drive data storage system, comprising:
   a slider body comprising a slider substrate material having a surface;
   a transducer supported by the slider body;
   a film applied to the surface; and
   a character pattern recessed within the film.

10. A disc head slider substrate wafer comprising:
    an upper surface and a lower surface, which is opposite to the upper surface;
    a plurality if individual slider body locations defined within the wafer;
    a plurality of transducers fabricated on the upper surface, each transducer positioned at a corresponding one of the individual slider body locations;
    a film applied to the lower surface; and
    a plurality of graphical patterns recessed within the film, wherein each graphical pattern is positioned at a corresponding one of the individual slider locations and represents a serial number for that slider body location.

* * * * *